US009595299B2

(12) United States Patent
Redmann

(10) Patent No.: US 9,595,299 B2
(45) Date of Patent: Mar. 14, 2017

(54) METHOD AND APPARATUS FOR ADAPTING AUDIO DELAYS TO PICTURE FRAME RATES

(71) Applicant: THOMSON LICENSING, Issy de Moulineaux (FR)

(72) Inventor: William Gibbens Redmann, Glendale, CA (US)

(73) Assignee: Thomson Licensing, Issy-les-Moulineaux (FR)

( * ) Notice: Subject to any disclaimer, the term of this patent is extended or adjusted under 35 U.S.C. 154(b) by 47 days.

(21) Appl. No.: 14/414,630

(22) PCT Filed: Feb. 15, 2013

(86) PCT No.: PCT/US2013/026251
§ 371 (c)(1),
(2) Date: Jan. 13, 2015

(87) PCT Pub. No.: WO2014/021936
PCT Pub. Date: Feb. 6, 2014

(65) Prior Publication Data
US 2015/0170712 A1    Jun. 18, 2015

Related U.S. Application Data

(60) Provisional application No. 61/678,243, filed on Aug. 1, 2012.

(51) Int. Cl.
*H04N 5/94* (2006.01)
*H04N 5/931* (2006.01)
(Continued)

(52) U.S. Cl.
CPC ............ *G11B 27/309* (2013.01); *G03B 31/02* (2013.01); *G11B 27/10* (2013.01); *H04N 5/04* (2013.01);
(Continued)

(58) Field of Classification Search
CPC ...... G03B 31/02; G11B 27/10; G11B 27/309; H04N 21/41415; H04N 21/4307;
(Continued)

(56) References Cited

U.S. PATENT DOCUMENTS

| 7,430,018 B1 | 9/2008 | Patel |
| 8,525,885 B2 * | 9/2013 | Steinberg ............... H04N 17/04 348/191 |

(Continued)

OTHER PUBLICATIONS www.dcimovies.com/DCIDigitalCinemaSystemsSpecv1.2.pdf_retrieved2010-07-22: dated Mar. 7, 2008, pp. 1-156.

*Primary Examiner* — Robert Chevalier
(74) *Attorney, Agent, or Firm* — Myers Wolin LLC

(57) ABSTRACT

To synchronize sound information with corresponding picture information for digital cinema compositions at different frame rates in a play list during play out of the digital cinema compositions, associated audio latency settings are first established for the corresponding picture information of the digital cinema compositions in the play list in accordance with the digital cinema composition frame rates. The timing between the sound information and the picture information is then adjusted during play out of the digital cinema compositions in accordance with the associated audio latency settings for the corresponding digital cinema composition frame rates.

19 Claims, 11 Drawing Sheets

(51) Int. Cl.
*G11B 27/30* (2006.01)
*G03B 31/02* (2006.01)
*G11B 27/10* (2006.01)
*H04N 21/414* (2011.01)
*H04N 21/43* (2011.01)
*H04N 21/439* (2011.01)
*H04N 21/44* (2011.01)
*H04N 5/04* (2006.01)
*H04N 9/802* (2006.01)

(52) U.S. Cl.
CPC ....... *H04N 9/802* (2013.01); *H04N 21/41415* (2013.01); *H04N 21/4307* (2013.01); *H04N 21/439* (2013.01); *H04N 21/4392* (2013.01); *H04N 21/44* (2013.01); *H04N 21/44004* (2013.01)

(58) Field of Classification Search
CPC .. H04N 21/43; H04N 21/44; H04N 21/44004; H04N 21/4392; H04N 5/04; H04N 9/802
USPC ....... 386/248, 264, 321, 323, 337, 338, 204, 386/203, 201, 207
See application file for complete search history.

(56) References Cited

U.S. PATENT DOCUMENTS

| | | |
|---|---|---|
| 2007/0019739 A1 | 1/2007 | Koyanagi et al. |
| 2007/0220049 A1 | 9/2007 | Hwang |
| 2010/0135381 A1 | 6/2010 | Hamamoto et al. |
| 2011/0235702 A1 | 9/2011 | O'Connell et al. |

\* cited by examiner

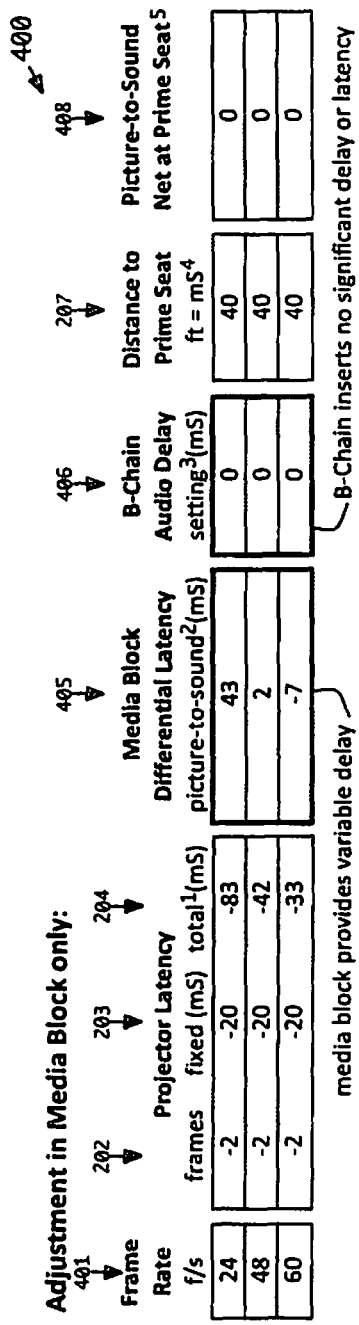

Adjustment in Media Block only:

| Frame Rate f/s | Projector Latency frames | Projector Latency fixed (mS) | Projector Latency total¹(mS) | Media Block Differential Latency picture-to-sound²(mS) | B-Chain Audio Delay setting³(mS) | Distance to Prime Seat ft = mS⁴ | Picture-to-Sound Net at Prime Seat⁵ |
|---|---|---|---|---|---|---|---|
| 24 | -2 | -20 | -83 | 43 | 0 | 40 | 0 |
| 48 | -2 | -20 | -42 | 2 | 0 | 40 | 0 |
| 60 | -2 | -20 | -33 | -7 | 0 | 40 | 0 | media block provides variable delay — B-Chain inserts no significant delay or latency 1 - Negative values represent amount by which picture is delayed.
2 - Positive means picture is output by media block before sound by number of mS;
    Negative means picture is output by media block after sound by number of mS.
3 - Positive value represents amount by which audio is delayed, in mS.
4 - Distance corresponds to additional audio delay (approximated here as 1mS of delay per foot).
5 - Positive means picture arrives before sound (i.e., sound is delayed), negative that appears before picture, by number of mS.

FIGURE 4

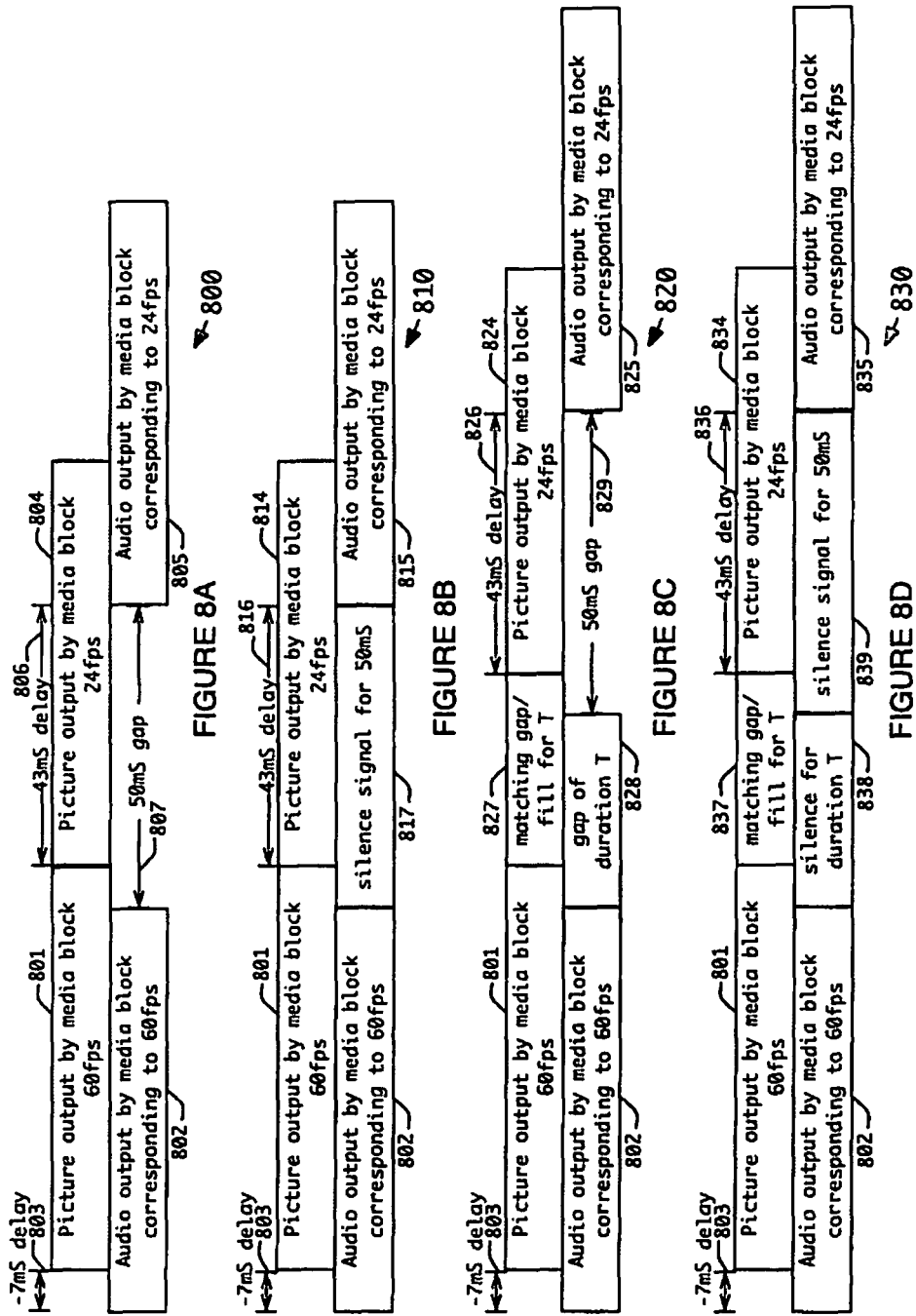

METHOD AND APPARATUS FOR ADAPTING AUDIO DELAYS TO PICTURE FRAME RATES

CROSS-REFERENCE TO RELATED APPLICATIONS

This application claims the benefit, under 35 U.S.C. §365 of International Application PCT/US2013/026251 filed Feb. 15, 2013 which was published in accordance with PCT Article 21(2) on Feb. 6, 2014 in English and which claims the benefit of U.S. provisional patent application Ser. No. 61/678,243 filed Aug. 1, 2012.

TECHNICAL FIELD

This invention relates to a technique for synchronizing sound (audio) information to picture (video) information.

BACKGROUND ART

Traditionally, the filming and presentation of motion picture film occurs at 24 frames per second in the US and Canada and typically, 25 frames per second in Europe and Asia. Beginning with the release of Peter Jackson's "The Hobbit" by Warner Bros toward the end of 2012, digital cinema exhibitors will begin facing the likelihood of receiving digital cinema compositions (i.e., content) at variety of motion picture frame rates for example 48 fps or even 60 fps. The presentation rate of the corresponding sound in such higher frame rate digital cinema compositions, however, will likely not change. Presently, digital theater systems present sound (audio) at a rate of 48,000 or 96,000 samples per second. Typical digital theater sound processing systems exhibit a small audio latency, on the order of a few samples, and the latency remains either constant, or relatively so (i.e., the different between a two sample latency in a digital system at 48 KHz sample rate and at 96 KHz remains on the order of to be $\frac{1}{48000}$ second).

Packet latencies in a digital network also vary relatively little and the typical audience member does not perceive such latencies because each audio samples exists somewhere between $\frac{1}{2000}$ to $\frac{1}{4000}$ the duration of a single frame of the digital cinema composition. However, most digital cinema projectors exist as signal processing pipelines. Picture information flows into the projector on a pixel-by-pixel basis for storage in a frame buffer. The pixels in the frame buffer undergo color correction, and/or scaling, and/or cropping according to the projector settings. Finally, such processing places the digital image into a form suitable for driving the imagers in the digital projector. The processing associated with such digital cinema projection incurs an artifact in that the latency (image processing) from the time the first pixel undergoes transmission to the projector to the time an image appears on-screen. However, because most modern projectors employ frame-buffered pipeline architectures for image processing, the projector latency ($t_{PICTURE\_LATENCY}$) generally varies with the rate at which frames are displayed. This is because, in a frame-buffered pipeline architecture, image data advances frame-by-frame through the stages of processing, progressing by one stage every frame interval, until the frame is displayed. In the general case, for an individual projector or model of projector, the values for $t_{PICTURE\_LATENCY}$ at different frame rates could be measured empirically, but in the case of a frame-buffered pipeline architecture, $t_{PICTURE\_LATENCY}$ can be represented by this equation:

$$t_{PICTURE\_LATENCY} = t_{FIXED} - \frac{FRAMES}{FRAME\_RATE} \quad \text{EQ. 1}$$

where:

FRAME_RATE is the rate at which the frames are provided in frames per second (which is not always an integer);

FRAMES is the number of frame-buffered stages (e.g., two) in the projector's image processing architecture, each of which may each take up to a frame interval to complete, and, $t_{FIXED}$ is a constant amount of time (e.g., −5 mS), which represents other transfer, processing, or setup time found in the architecture, that does not vary with frame rate and is not represented in the second term of EQ. 1. Herein, a convention is used so that latencies that increase picture delay are more negative, whereas latencies that increase audio delay are positive. This convention also applies in the comparative: Latencies that increase picture delay with respect to the audio are more negative, too. For the purpose of discussion herein and easy provision of plausible example latency values, and not by way of limitation, a projector architecture for which the latency is determinable with EQ. 1 is assumed. For other architectures, different equations (not shown) may apply, or empirical latency measurements can be made.

For the example case of a digital cinema projector having the example values of $t_{FIXED}$ (−5 mS) and FRAMES (2) above, at a rate of 24 frames per second, the projector will incur a latency of −0.005.−2/24 seconds, or −88⅓ mS. However, at 48 frames per second, the projector will incur a latency of −0.005−2/48 seconds, or −46⅔ mS; and, at 60 fps, the latency becomes −0.005−2/60=−38⅓ mS. (Recalling that from the convention above, a less negative value means the picture is less delayed).

The frame rate of a digital cinema composition is determined by metadata within the composition itself. If the image assets of a composition are labeled as being 24 frames per second, the presentation is made at 24 frames per second. If the assets are labeled as being 48 frames per second, the presentation is made at that frame rate. The frame rate is represented as metadata within the composition, and commercial digital cinema devices do not offer the option to alter that frame rate. In a case where a digital cinema device is incapable of playing a composition at the specified frame rate, the device will refuse to play the composition.

With respect to sound in a digital cinema theatre, there are two substantial sources of latency in the presentation of audio ($t_{SOUND\_LATENCY}$) that offset some or all of the projector's intrinsic latency 145, as represented by this equation:

$$t_{SOUND\_LATENCY} = t_{AUDIO\_DELAY} + t_{TIME\_OF\_FLIGHT} \quad \text{EQ. 2:}$$

where:

$t_{TIME\_OF\_FLIGHT}$ is the time for sound to travel through the air from a speaker to a member of the audience member; and, $t_{AUDIO\_DELAY}$ is a property of a theatre sound processor, which may be constant or may be manually or automatically adjustable.

Delays caused by audio processing, audio signal transmission (which in some modern auditoriums is over a network), and amplification are small relative to these other values and may be either neglected, or considered as part of $t_{AUDIO\_DELAY}$.

With the speed of sound in air being about 1, 126 feet/second (with variations depending on temperature and humidity), a rough approximation (and slight underestimation) is that sound travels 1 ft. in 1 mS. After audio signals have been emitted from the speaker, the distance through the free air of the auditorium to the audience determines the $t_{TIME\_OF\_FLIGHT}$ portion of the sound latency, and is greatest for those seated furthest from the speaker.

The ideal sound and picture synchronization occurs when the picture latency and sound latency are exactly equal, producing a synchronization error of zero, according to this equation:

$$t_{SYNC\_ERROR} = t_{SOUND\_LATENCY} + t_{PICTURE\_LATENCY} + t_{DIFFERENTIAL\_DELAY} \quad \text{EQ. 3}$$

which expands by EQ. 2 to:

$$t_{SYNC\_ERROR} = = t_{AUDIO\_DELAY} + t_{TIME\_OF\_FLIGHT} + t_{PICTURE\_LATENCY} + t_{DIFFERENTIAL\_DELAY} \quad \text{EQ. 4}$$

where:

$t_{SYNC\_ERROR}$ represents perfect sound and picture synchronization when zero and, per the convention described above, is negative to represent the picture being late with respect to the sound, and positive to represent the sound being late with respect to the picture; and, $t_{DIFFERENTIAL\_DELAY}$ (also herein called "differential latency" and abbreviated as "∂L") is a setting available on some digital cinema media blocks, which allows a technician to modify the relative delay between when picture is sent to a projector and audio output to the theatre audio equipment. Such digital cinema media blocks are supplied with a factory default value for $t_{DIFFERENTIAL\_DELAY}$, which varies by manufacturer. Some manufacturers deliver systems with $t_{DIFFERENTIAL\_DELAY}$ set to zero, such that a technician must manually set $t_{AUDIO\_DELAY}$ to achieve synchronization by offsetting both $t_{PICTURE\_LATENCY}$ and $t_{TIME\_OF\_FLIGHT}$. Other manufacturers provide a factory default for $t_{DIFFERENTIAL\_DELAY}$ that approximately offsets $t_{PICTURE\_LATENCY}$ and a typical $t_{TIME\_OF\_FLIGHT}$, so that $t_{AUDIO\_DELAY}$ can be approximately zero, except for larger than typical auditoriums.

In present-day cinemas, whether digital or film-based, there are two manual controls: One adjusts $t_{AUDIO\_DELAY}$ and, if available, is a technician's setting generally not made by the everyday operator, the other adjusts $t_{DIFFERENTIAL\_DELAY}$ and represents different technologies in film and digital cinema equipment. For film projectors, $t_{DIFFERENTIAL\_DELAY}$ is adjusted by physically repositioning the optical soundtrack reader to be closer to or further from the film gate, along the film path, that is, moving the optical soundtrack reader closer to the film gate, $t_{DIFFERENTIAL\_DELAY}$ is made more positive (i.e., the sound is read later). For decades, the film's audio did not go through an external processor, so this setting was the only one available for offsetting $t_{TIME\_OF\_FLIGHT}$ (i.e., $t_{AUDIO\_DELAY}$ and $t_{PICTURE\_LATENCY}$ were both essentially zero). For digital cinema media blocks, $t_{DIFFERENTIAL\_DELAY}$ is a configuration available to a technician, but again, generally not made available to the everyday operator. In digital cinema installations, both $t_{DIFFERENTIAL\_DELAY}$ and $t_{AUDIO\_DELAY}$ must be correctly set to offset $t_{PICTURE\_LATENCY}$ and $t_{TIME\_OF\_FLIGHT}$.

From the above, it is clear that a present-day (prior art) digital cinema auditorium system having a projector with the example properties described above and adjusted to present synchronized picture and sound at 24 fps (so that $t_{SYNC\_ERROR} = 0$), when called on to present a digital cinema composition at 48 fps, will have a $t_{SYNC\_ERROR}$ of $t_{PICTURE\_LATENCY}@24 - t_{PICTURE\_LATENCY}@48$ is $(-88\frac{1}{3} - 46\frac{2}{3}) = -41\frac{2}{3}$ mS and display the picture $41\frac{2}{3}$ mS sooner than the sound, or about two frames early (i.e., the sound will seem to be two frames late). Such error in the synchronization, in the opinion of some, is not drastic. As a constant synchronization error, human audience members will accommodate such an offset. However, when a digital cinema system executes a playlist with mixed frame rate digital cinema compositions, the $t_{SYNC\_ERROR}$ will change among compositions having different frame rates. The frame rate variation will highlight the differences in picture/sound synchronization, making it apparent and annoying to even non-expert audiences.

Historically, virtually all digital cinema compositions have existed at the same frame rate (24 frames per second). Few, if any, content providers had provided digital cinema compositions at other frame rates, so few, if any, exhibitors have compiled different frame rate digital cinema compositions in the same playlist. To the extent that the problem existed at all, exhibitors have ignored this problem.

Thus, a need exists for a technique for synchronizing sound (audio) information to picture (video) information when the picture information has different frame rates.

BRIEF SUMMARY OF THE INVENTION

Briefly, in accordance with a illustrative embodiment of the present principles, a method for synchronizing sound information with corresponding picture information for digital cinema compositions at different frame rates in a play list during play out of the digital cinema compositions commences by first establishing for the corresponding picture information of the digital cinema compositions in the play list, associated audio latency settings in accordance with the digital cinema composition frame rates. The timing between the sound information and the picture information is adjusted during play out in of the digital cinema compositions in accordance the associated audio latency settings for the corresponding digital cinema composition frame rates.

BRIEF DESCRIPTION OF THE DRAWINGS

FIG. 4 depicts a second exemplary table illustrating how dynamic synchronization settings in a digital cinema media block can compensate for variable projector latencies to achieve consistent picture-and-sound synchronization at different frame rates in accordance with the present principles;

FIGS. 8A-8D depict several alternative exemplary timelines showing the effect on the picture and sound information of a digital cinema list undergoing play out during a transition from 60 fps to 24 fps in accordance with the present principles;

DETAILED DESCRIPTION

Figure 1A:
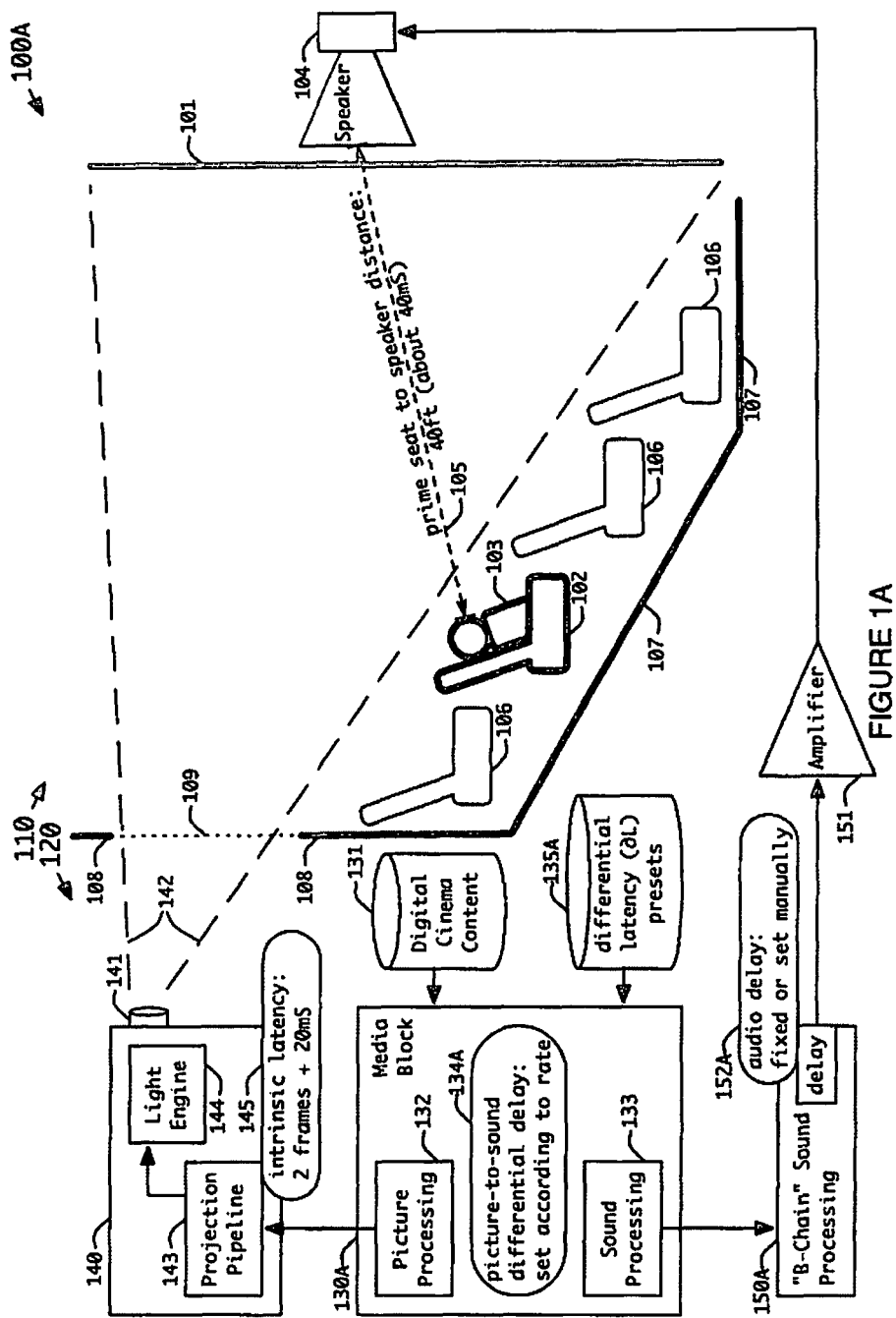
FIGS. 1A and 1B depict exemplary block diagrams of first and second illustrative embodiments, respectively, of a digital cinema theatre system of the present principles, showing the net effect of timing latencies and adjustable delays for synchronizing picture information and sound information for an audience.
Figure 1B:
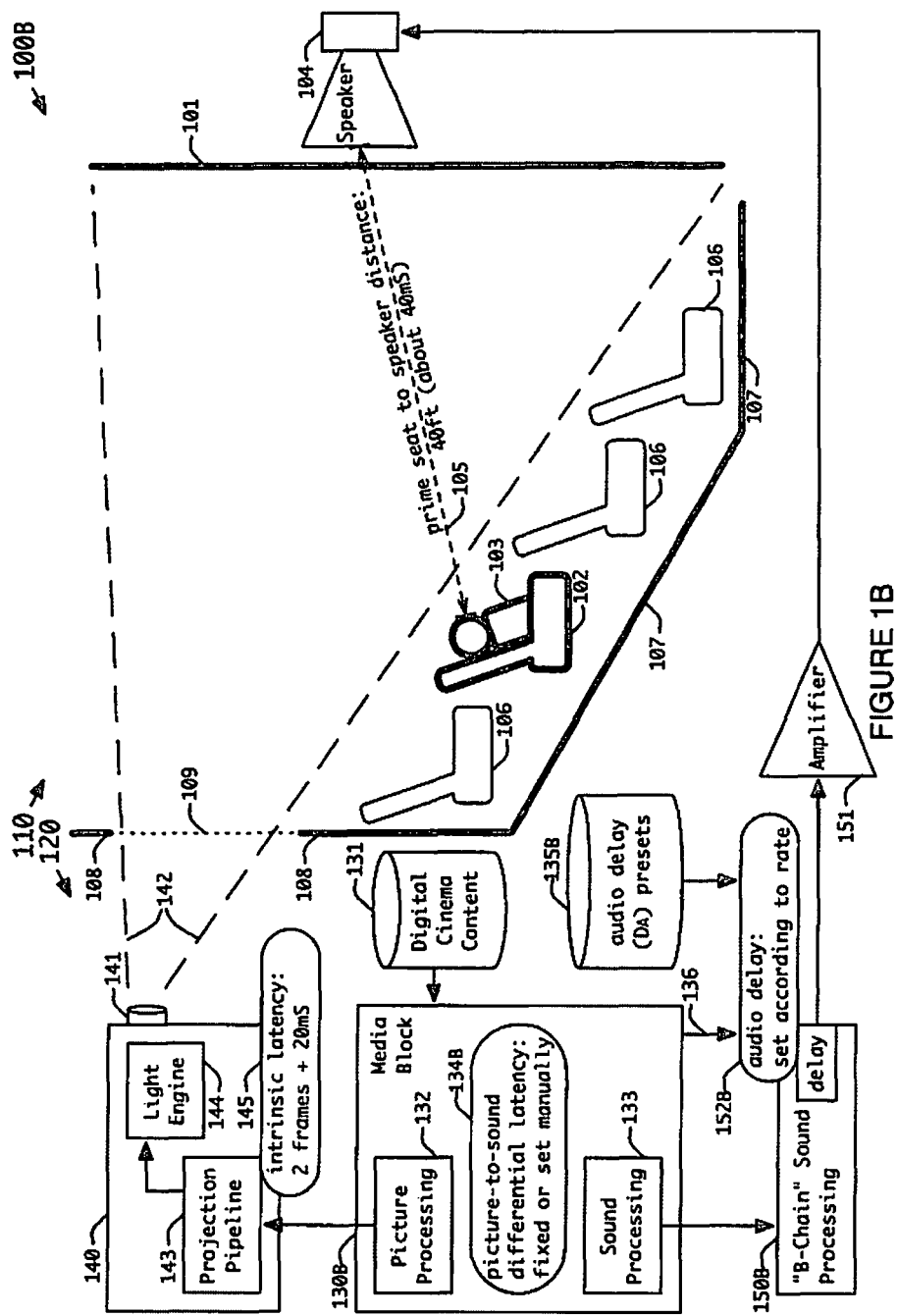

FIGS. 1A and 1B depict exemplary block diagrams of first and second illustrative embodiments, respectively, of digital cinema theatre systems 100A and 100B, respectively, for practicing the sound and picture information synchronization technique of the present principles. Referring to FIG. 1A, the digital theater system 100A comprises a digital cinema digital cinema media block 130A for rendering multiple digital cinema compositions received at their specified frame rates from a digital cinema composition storage unit 131. The digital cinema media block 130A provides the rendered pictures to a digital cinema projector 140 and the corresponding sound to a theatrical sound processing system 150A (also known in the industry as a "B-chain"). As discussed in detail herein, the digital cinema compositions can have different frame rates. Presently, most digital cinema compositions have a frame rate of 24 frames per second. However, some newer digital cinema compositions now have higher frame rates, typically, 48 or even 60 frames per second, which can give rise to synchronization difficulties with the corresponding sound (audio) information during play out because of certain latencies as discussed above.

The digital cinema digital cinema media block 130A typically comprises various mechanisms for reading the data representative of picture and sound information for a digital cinema composition received from the digital cinema composition storage unit 131. The digital cinema media block 130A supplies data representative of the picture information to a picture processing module 132, and supplies the data representative of the sound information to a sound processing module 133. In order to achieve synchronization between the sound and the picture information, the digital cinema media block 130 will allow the picture processing module 132 to run ahead (or behind) the sound processing module 133 as defined by picture-to-sound differential delay value 134A, typically set to zero (0) mS. A delay of zero indicates that the first pixel of an image output by picture processing module 132 remains essentially synchronous with the sound output from sound processing module 133 associated with the first audio sample corresponding to that first pixel in the composition read from the storage unit 131.

In this exemplary embodiment of the present principles, a delay memory 135A can supply a different setting for the differential delay 134A for each different frame rate of the digital cinema composition undergoing play out. In other embodiments, in lieu of reading a setting from delay memory 135A, the digital cinema media block 130A can calculate a delay setting from other data stored in the memory 135A, where "other data" might be, for example, an equation dependent on frame rate and having certain predetermined parameters, such as EQ. 1 and values for its variables $t_{FIXED}$ and FRAMES).

In addition to, or in place of such delay data stored in the memory 135A, the digital cinema media block 130A could obtain or calculate the delay from data returned from the digital cinema projector 140 following an inquiry regarding the inherent latency 145 of the projector, assuming the digital cinema projector 140 possesses the ability to report its inherent latency 145 for each particular frame rate, or return the parameters necessary for the calculation (e.g., $t_{FIXED}$ and FRAMES apropos to EQ. 1). In an exemplary embodiment consistent with FIG. 1A, the digital cinema media block 130A takes account of the frame rate of each digital cinema composition in a playlist and retrieves the appropriate differential delay value from the delay memory 135A for use whenever a change in frame rate becomes necessary.

Typically, the digital cinema media block 130A, the digital cinema projector 140, and theatrical sound processing system 150A reside in a projection booth 120. A wall 108 separates the projection booth 120 from the auditorium 110. The wall 108 has a glass portal 109 through which the projection beam 142 generated by the digital cinema projector 140 shines through a projector lens 141 onto a screen 101. In some embodiments, the digital cinema media block 130A and the digital cinema projector 140 can exist as a single integrated unit, rather than the two separate elements depicted in FIG. 1A. The theatrical sound processing system 150A provides audio through an amplifier 151 to one or more speakers 104 located behind the screen 101. (The speakers 104 bear the designation "main speakers" or "mains"). The auditorium can include additional speakers (not shown) located elsewhere (also referred to as "surround speakers" or "surrounds.") Some auditoriums also have special transducers (none shown), sometimes called subwoofers, designated for low-frequency effects (LFE), which generally lie behind or below the screen 101 and in that configuration, such special transducers have the same effect as the main speakers 104 for this discussion.

The digital cinema projector 140 receives the picture information, generally a pixel at a time, from the digital cinema media block 130A. A projection pipeline 143 accepts the picture information for assembly and processing, often in several stages. The projection pipeline 143 typically comprises one or more frame buffers. The final stage of pipeline 143 delivers processed image data (the picture information) to a light engine 144 comprising a plurality of imagers (typically, one for each primary color), which modulates light provided by an illuminator (not shown). The lens 141 projects this modulated light from the imagers onto the screen 101 to render a picture for viewing by an audience. The digital cinema projector 140 has a measurable intrinsic latency 145 ($t_{PICTURE\_LATENCY}$), from the time the digital cinema media block 130A sends first pixel from the picture processing module 132 to the digital cinema projector 140, to the time that pixel appears on the screen 101. The intrinsic latency of the digital cinema projector 140 typically comprises both constant and frame-rate dependent components.

For the purpose of the present principles, predetermined values can exist for the intrinsic latency for frame rates of concern. Practically, several mechanisms exist for determining this latency. For example, a projector manufacturer, theater operator or technician can empirically measure the latency by using an oscilloscope (not shown) and a photocell (not shown) responsive to the pixel illumination. With such equipment, the theater operator or technician can monitor the picture information transmitted from the digital cinema media block 130A to the digital cinema projector 140 and measure the delay until that picture information is projected on the screen at each of the different frame rates. Alternatively, intrinsic latency 145 may be determined from the projector's specifications. In a still different way, changes in intrinsic latency may be estimated based on synchronization changes observed or measured between the sound and picture (e.g., as may be measured using a synchronization checker such as the "Syncheck3" with appropriate test media, as manufactured and distributed by Pharoah Editorial, Inc. of New York, N.Y.). In other embodiments (not shown), the digital cinema projector 140 could report its intrinsic latency 145 for each frame rate to the digital cinema media block 130A, or to another controller (not shown). Then digital cinema media block 130A or the other controller (not shown) can take appropriate steps to compensate using the differential and audio delays 134A/152A.

Rather than considering the whole audience in a complex weighting scheme, for the purposes of measurement or estimation, a hypothetical audience member 103 positioned in a "prime seat" 102 can represent the audience. The "prime seat" 102 can represent an actual seat (e.g., seat 102 in FIG. 1A) or a hypothetical seat, e.g., a "prime seat" positioned in the middle of an aisle. The prime seat 102 generally lies toward the center of the theatre and serves as the reference position for setting the picture (video) and sound (audio) synchronization, as well as sound equalization, loudness, picture brightness, and other parameters expected to deviate more or less uniformly for seat positions increasingly distant from the prime seat. By properly choosing the prime seat 102 for setting these parameters, an exhibitor can maximize the expected quality of the viewing experience over all seats in the auditorium. Traditionally, theater operators measured these parameters at the location of the prime seat 102 at a height above the auditorium floor 107 approximately corresponding to the head-height of a hypothetical seated audience member 103 seated in the prime seat. Thus, such measurements provide values for those parameters as might be experience by an actual person sitting in the place of hypothetical audience member 103.

The measurements made by the theater operator can include the distance 105 between the head of the hypothetical audience member 103 and the center main speaker 104. In many cases, the theater operator will estimate this distance based on the distance from prime seat 102 to the screen 101, for example because the screen hides the speaker 104. In some cases, the theater operator can establish the distance 105 from a plan drawing of the auditorium. In other cases, the theater operator can define the distance 105 and use that defined distance to specify the location of prime seat 102 (along the centerline of the floor 107). For example, the theater operator could establish a policy that dictates that "the prime seat shall lie 2.5 screen heights from the screen, along the centerline of the auditorium", in which case a 10-foot high screen would a priori result in an estimated prime-seat-to-speaker distance 105 of 25 feet.

As well known in the art, in a correctly adjusted auditorium, sound coming from the speaker(s) 104 behind the screen 101 will arrive at every seat 102 and 106 in the house before the corresponding sound arrives from any surround speaker (none shown) in the auditorium. This ensures that sounds intended to originate from the screen actually seems to originate from the screen, which would not be the case if the first arriving sound originated from a surround speaker and the corresponding sound the from speaker(s) 104 arrived some time later. Traditionally, a proper setting for the fixed surround delay (not shown) in theatrical sound processing system 150A applied to all surround speaker channels will assure that no seat in auditorium 100 receives sound in a digital cinema composition provided coincidentally from a surround speaker before that sound has arrived from the main speaker(s) 104. The sound from the surround sound speaker(s) could arrive coincidentally with the sound from the main speaker(s), but not before. The correct method for setting this fixed surround delay relative to the main speakers remains well known in the art and neither the value for its setting, nor the method of its setting, will change when applying the picture and sound synchronization technique of the present principles. The surround sound delay differs from the latency delay 152A associated with different frame rates. However, the latency delay 152A will affect the main, surround, and LFE channels equally and in addition to such prior art surround delays.

FIG. 1B illustrates the alternate preferred embodiment 100B of a digital cinema theatre system for practicing the synchronization technique of the present principles. The digital cinema theatre system 100B of FIG. 1B possesses all the same or similar elements as the digital cinema theatre system 100A of FIG. 1A, where the similar elements are connected and/or function a little differently. Therefore, for those "similar" elements, reference numerals serve to identify like elements, except that the letter "B" rather than the letter "A" appears in FIG. 1B for the corresponding element in FIG. 1A. The digital cinema theatre system 100B of FIG. 1B differs from the digital cinema theatre system 100A of FIG. 1A by virtue of having a manually adjustable picture-to-sound differential delay 134B. This allows manual setting of the delay to zero or some other value regardless of frame rate. Then, digital theater system 100B automatically adjusts only audio delay 152B in the theatrical sound processing system 150B, according to an indication communicated by digital cinema media block 130B using the signal 136. In the illustrative embodiment of FIG. 1B, the digital cinema media block 130B can recall preset values 135B for audio delay ($t_{AUDIO\_DELAY}$) based on the signal 136, which is determined on the basis of frame rate for play out of a particular composition. In another embodiment (not shown), the signal 136 could comprise data representative of the appropriate setting ($t_{AUDIO\_DELAY}$) for audio delay 152B, in which case, the digital cinema media block 130B will directly read the presets for audio delay ($t_{AUDIO\_DELAY}$) from the memory 135B for forwarding the delay 152B as the signal 136 (though with a connection of memory 135B to media block 130B, as shown for 135A to 130A).

Figure 2:
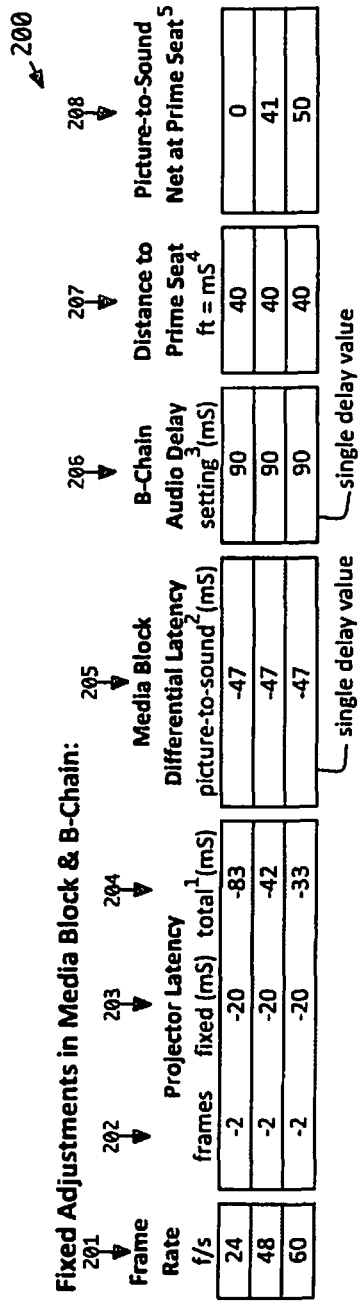
FIG. 2 depicts an exemplary table illustrating how variable projector latencies and fixed audio delays in existing digital cinema systems can produce varying errors in synchronization.

FIG. 2 shows hypothetical exemplary data that a theater operator could expect to observe in the auditorium 100A when using present-day digital cinema technology without the benefit of the present invention (e.g., absent the differential delay preset values 135A for achieving picture and sound synchronization for different frame rates.). The fixed adjustments table 200 presents three rows of data, each representing the behavior of the system given digital cinema compositions presented at 24, 48, and 60 frames per second, respectively. The frame rate column 201 indicates the corresponding composition's play out rate in frames per second (f/s). The projector latency-related columns 202-204 indicate the delays the digital cinema projector 140 applies (in this and the following examples, in accordance with EQ. 1, and the sign convention described therewith) to the picture (video) elements of the composition, relative to the sound (audio) elements. Different pipeline architectures used in digital cinema projectors can produce a pipeline latency component measured in frames (i.e., FRAMES in EQ. 1), for example, two or three frames of latency, or some different number, as indicated by the "2" value shown in column 202 for the digital cinema projector 140. In some unusual cases (none shown), FRAMES could plausibly be a non-integer value, for example if the projector's image processing architecture were to employ in a field-interlaced or block operating mode in any of its stages. Some digital cinema projectors possess a fixed latency component invariant with respect to the frame rate (i.e., $t_{FIXED}$), shown for digital cinema projector 140 in column 203 of FIG. 1. The total projector latency ($t_{PICTURE\_LATENCY}$), expressed in column 204, comprises the sum of the fixed latency component (column 203) plus the quotient of the frames of latency component (column 202) divided by the frame rate (column 201), per EQ. 1. As indicated in column 204, at higher frame rates, the aggregate digital cinema projector latency drops. The digital cinema projector latency can only have a negative value because the projector can only display an image after receipt from the digital cinema media block and cannot induce delay in the sound at all.

Column 206 of FIG. 2 indicates the delay setting 152A (here, 90 mS) for the theatrical sound processing system 150A (i.e., the B-Chain of FIG. 1A) or simply the value of the sound processing system delay if fixed or intrinsic. In this example case of a prior art system, the sound processing system delay value remains unchanged at all frame rates. This value represents the delay of the sound (audio) relative to the picture (video), and can only have a positive value, since the theatrical sound processing system 150A cannot emit audio before its receipt and cannot induce delay in the picture at all. Column 207 indicates the audio delay induced by the time-of-flight of sound traversing the speaker-to-the prime seat distance 105, (which in the example of FIG. 1A constitutes 40 feet). The value of 40 mS indicated in Column 207 for the delay represents a slight over approximation. (More precisely, in dry air at 20° C., the speed of sound is 1126 ft/second, giving a time-of-flight closer to 35.5 mS for 40 feet, slightly less if the air were humid, or slightly more if the air were colder). For the purposes of discussion, the approximation of one-foot of travel equals one millisecond of delay is convenient and sufficient. This approximation remains constant for all frame rates, but would change for differently sized auditoriums, or with a different choice for prime seat 102.

The result shown in column 208 represents the picture-to-sound net latency ($t_{SYNC\_ERROR}$) at the prime seat shown 102 of FIGS. 1A and 1B at each frame rate in column 201 and should ideally always be zero in each row. In table 200, the theater operator or technician has tuned the digital cinema system using conventional means to produce this ideal zero latency at 24 fps by setting the digital cinema media block differential latency ($t_{DIFFERENTIAL\_DELAY}$) 134A manually. (Note that FIG. 2 represents values for a prior art auditorium and does not make use of the frame rate dependent differential delay preset values 135A of the present invention). For each row, the net latency in column 208 comprises the sum of the values in the columns 204, 205, 206, and 207, per EQ. 4, for the same row. For the first row of table 200, corresponding to 24 fps, summing the values in the columns 204, 206, and 207 gives rise to the following mathematical relationship (−83+90+40)=47 mS. Thus, setting the digital cinema media block differential delay 134A to a value −47 mS (as occurs throughout column 205) would result in a zero sum in the column 208 and perfectly synchronized picture and sound when observed from prime seat 102, but only at 24 fps. For other frame rates, as shown in the second and third rows of column 208, the fixed values set for each of columns 205 and 206 no longer produce the net latency of zero.

The effect noted in FIG. 2 represents a substantial problem that either requires a distinct manual setting each time a digital cinema playlist presents a composition with a frame rate different than its predecessor, or subjects the audience to varying sound and picture synchronization each time a digital cinema composition has a different frame rate. Present-day digital cinema media blocks (whether in an integrated or external form-factor), such as those manufactured by Doremi Labs, Inc. of Burbank, Calif.; Dolby Laboratories, Inc of San Francisco, Calif.; GDC Technology (USA) LLC of Burbank, Calif.; Qube Cinema, Inc. of Burbank, Calif.; and Sony Professional Solutions of America of Los Angeles, Calif.; all operate in this way, providing at most a single setting for differential delay in the digital cinema media block independent of frame rate. Similarly, theatrical sound processing equipment manufactured for use in the B-Chain only offer a single overall delay value, if any. Adjustment of these delays typically occurs by editing specific the configuration loaded when the digital cinema media block or sound processor boots up, though some manufacturers offer manual adjustment of the setting using a corresponding user interface (not shown). No present day systems offer separate settings automatically selected for use with digital cinema compositions having different frame rates.

While in some instances theater operators or their personnel can calculate the net latency (e.g., the values represented in column 208 of FIG. 2) from the equipment manufacturers' specifications (e.g., for columns 202, 203, 204, and 205, and if fixed, column 206), empirical measurement of net latency (i.e., $t_{SYNC\_ERROR}$) remains more common. For example, a technician tuning a theatre can use a synchronization meter such as the Syncheck3 by Pharoah Editorial, Inc. of New York, N.Y., which offers a digital readout of whether the picture or audio lags the other and by how many milliseconds. A technician can also measure net latency with a two-channel oscilloscope, one channel monitoring the sound through a microphone and the other channel monitoring the picture with a photodetector. In either case, the technician will use special test clip of content to make such measurements, for example a clip having a single frame of white with the remaining frames in black. The single frame of white corresponds in the content to an audio tone burst and the frames of black correspond to silence. With that clip playing repeatedly, the technician can read either the meter or the oscilloscope to discern the net latency (as in column 208) to determine whether the sound (the burst of tone) or picture (the flash of white) arrived first at the prime seat, and by how much.

Using such tools, a theater operator or technician can set the digital cinema media block synchronization empirically, by making whatever offsetting adjustments needed for the measured net latency. For example were such a meter to indicate that picture leads the sound by 10 mS, then the theater operator or a technician could adjust the differential delay 134A/134B by −10 mS, thereby delaying the picture more. (As discussed earlier, in accordance with the convention used herein, negative values represent a greater delay of picture with respect to the sound). Alternatively, the theater operator or technician could adjust the audio delay 152A/152B by −10 mS, thereby reducing the audio delay, provided the delay 152A/152B had a value of at least 10 mS since the value of the delay 152A/152B cannot be less than zero. Alternatively, a combination of those adjusts may be made. Were the meter to indicate that sound leads the picture by 10 mS, then the theater operator or technician can increment either the differential delay 134A/134B or the delay 152A/152B by 10 mS to offset (delay) sound by an additional 10 mS with respect to the picture. Alternatively, the theater operator or technician could increment both differential delay 134A/I 34B and delay 152A/152B by 5 mS, or two different values that total 10 mS (e.g., 3 mS and 7 mS; −5 mS and 15 mS, etc.), as long as delay 152A/152B remains greater than or equal to zero.

Regardless of the manner in which a theater operator or technician sets the delays 134A/134B and 152A/152B to achieve a net picture-to-sound latency of zero for a frame rate of 24 fps (as seen in the first row of column 208), using the same settings (shown throughout columns 205 & 206) at different frame rate conditions (e.g., as in the second and third rows, for 48 and 60 fps respectively), will result in a net synchronization (shown in column 208, second and third rows) having a non-zero value. That is, even though a prior art digital cinema system achieved picture and sound synchronization at the prime seat at 24 fps, the system will not provide synchronization at other frame rates.

Figure 3:
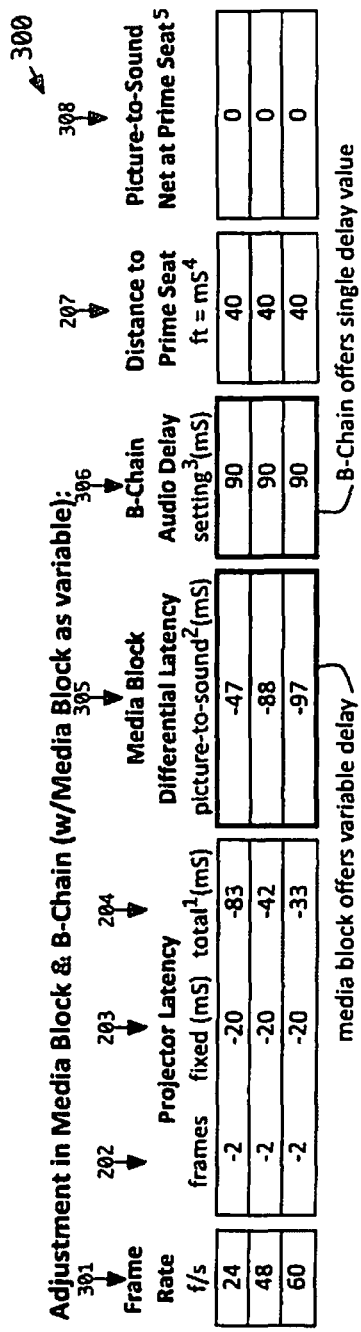
FIG. 3 depicts a first exemplary table illustrating how dynamic synchronization settings in a digital cinema media block and a static delay in the theater sound processing system can compensate for variable projector latencies to achieve consistent picture-and-sound synchronization at different frame rates in accordance with the present principles.
Figure 5:
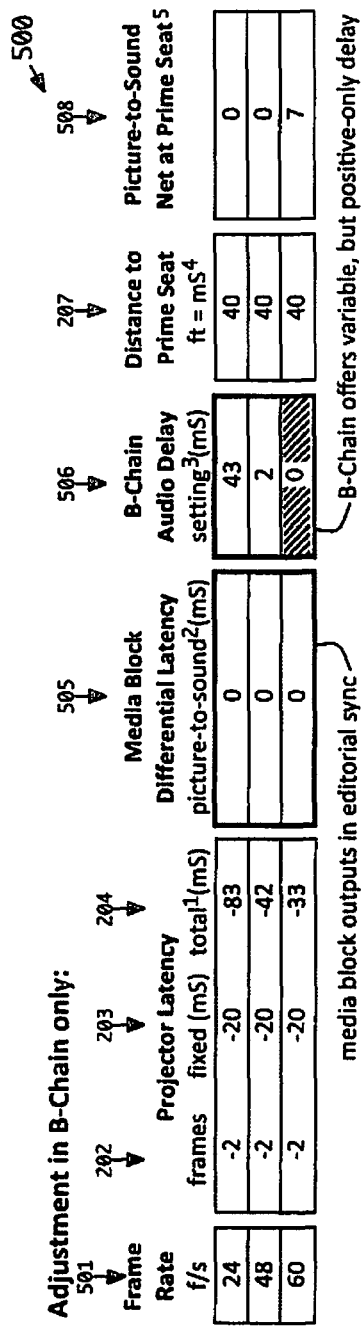
FIG. 5 depicts a third exemplary table illustrating how dynamic delay settings in the audio chain may compensate for most, but not necessarily all, of the variable projector latencies to achieve improved picture-and-sound synchronization at different frame rates in accordance with the present principles.

In accordance with the present principles, to maintain synchronization at different frame rates, the digital cinema system must make use of different values chosen for either or both of the delay values 134A/134B and 152A/152B for each different frame rate, as discussed in conjunction with FIGS. 3, 4, and 5 showing tables 300, 400, and 500, respectively. Note that for all the examples represented in FIGS. 2-5, the projector 140 will presumably exhibit the same exemplary behavior consistent with respect to each of the selected frame rates, and the relative position of the prime seat 102 to the speaker 104 is presumed to be constant. Thus, with respect to each of the selected frame rates, the projector latency columns 202-204 and distance to prime seat values in column 207 remain the same in each of tables 200, 300, 400, 500.

In FIG. 3, table 300 shows exemplary values for each of the different frame rates of column 301, consistent with the configuration of digital theater system 100A in FIG. 1A, in which the delay setting 152A has a constant value shown throughout column 306 and only the digital cinema media block differential latency setting for the differential delay 134A varies, as shown in column 305. The values provided in column 305 achieve substantial synchronization of sound and picture at the prime seat 102 for each of the frame rates listed, as shown by the zero values in column 308. In this example, all the latencies of the differential delay values 134A have the same negative sign, that is, all the settings represent that the digital cinema media block 130A outputs the picture to the projector 140 some number of milliseconds after the corresponding sound has been output to the theatrical sound processing system 150A.

In FIG. 4, table 400 shows a different configuration where the theatrical sound processing system 150A introduces negligible latency, represented by the zeros in column 406. These values could constitute actual settings of the delay 152A in the theatrical sound processing system 150A. Alternatively, the audio processing equipment might offer no delay setting 152A and this latency that is essentially zero for the B-Chain, as shown in column 406, is intrinsic. For each of the frame rates in column 401, the differential delay 134A in digital cinema media block 130A has a different setting, spanning both signs, as shown in column 405, depending on which of the sound or picture requires delay with respect to the other to achieve the zero values in column 408. A similar approach would offer the same benefit in the case where the theatrical sound processing system 150A imposed a fixed, but sufficiently small delay (for this example, less than 7 mS), which would still require digital cinema media block 130A to provide differential delay 134A with values of both signs, depending upon frame rate.

In FIG. 5, table 500 shows the values for the digital cinema system 100B of FIG. 1B, in which the digital cinema media block 130B does not have variable differential delay 134A (or it is set to be zero). Instead, the digital cinema media block 130B, assures that the differential latency 134B between the picture and sound as emitted by the digital cinema media block remains zero, also called 'editorial sync'. (Alternative embodiments could have the digital cinema media block differential latency set manually to some constant value, often near zero, but some manufacturers of present-day digital cinema media block equipment default to other non-zero values). In the exemplary table 500, for each of the different frame rates in column 501, the theatrical sound processing system (the B-Chain) 150B is automatically set to the different delay values in the column 506, which, as previously pointed out, cannot fall below zero. Since the delay 152B cannot have a value ($t_{AUDIO\_DELAY}$) less than zero, some circumstances can produce cases where delay 152B cannot achieve perfect synchronization of picture and sound, as shown by the hashed entry in the 60 fps row of the column 506, where even the minimum delay setting of zero remains insufficient to compensate for the amount by which the sound (audio) arrives late to the prime seat 102. In other words, the unavoidable delay imposed on the sound by the time-of-flight from the speaker 104 (listed in column 207) remains greater than the total delay on the picture imposed by the projector 140 at 60 fps (listed in column 204), so that ultimately the minimum setting of the delay 152B to zero does not sufficiently compensate for the difference, with the result that, at 60 fps, some residual net latency will exist and the sound will arrive late by 7 mS at the prime seat 102, which for some situations may be completely acceptable.

As described above, the digital cinema media block 130B of FIG. 1B could make or trigger the automatic setting of the delay 152B to the value ($t_{AUDIO\_DELAY}$) provided in audio delay preset memory 135B in response to the signal 136, or to another control signal (not shown), e.g., from the projector 140 or a separate controller (none shown). In any of these embodiments, the theatrical sound processing system 150B receives an indication of the current frame rate sufficient to determine what setting to use for audio delay 152B. In other embodiments, the control signal to audio delay 152B may indicate the audio delay value ($t_{AUDIO\_DELAY}$) itself.

Figure 6:
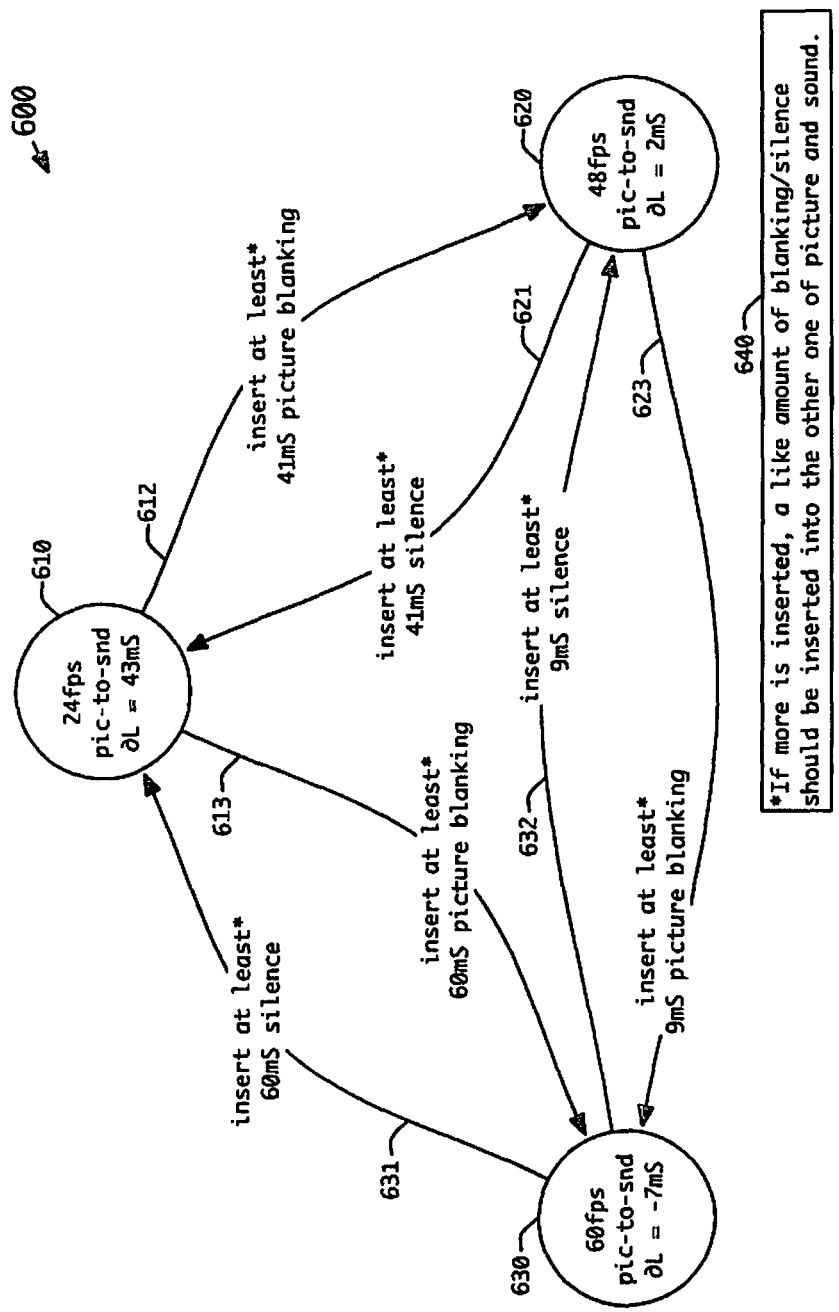
FIG. 6 depicts an exemplary transition diagram corresponding to the table of FIG. 3 enumerating the individual differential latencies applied at different frame rates, and exemplary amendment to the picture or audio information corresponding to each frame rate transition in accordance with the present principles.

FIG. 6 shows an exemplary state transition diagram 600, corresponding to the delay settings presented in the table 400 of FIG. 4. Each of the three states 610, 620, and 630 corresponds to the digital cinema media block 130A of FIG. 1A playing digital cinema compositions at 24, 48, and 60 fps, respectively. In each state, the picture-to-sound differential latency ∂L (used here as a more compact and convenient representation for $t_{DIFFERENTIAL\_DELAY}$) will have the following values 43, 2, and −7 mS, respectively, in accordance with the contents of column 405 of FIG. 4. The transitions 612, 621, 623, 632, 613, and 631 among the states 610, 620, and 630 each indicate a minimum amount of padding to the sound or picture necessary to bridge a transition between the state's different differential latencies, ∂L.

The transition 612 from the state 610 (24 fps) to the state 620 (48) fps causes the picture-to-sound differential latency ∂L to change from 43 mS to 2 mS. As a result, the differential latency changes by −41 mS which corresponds to a gap in the picture (because the picture is being more delayed by the media block to compensate for less delay by the projector), assuming that the sound (audio) from one digital cinema composition does not undergo cropping or overlapping (i.e., mixed or cross-faded) as will be discussed in more detail below. Some digital cinema media blocks or projectors can easily provide such a picture gap by providing black images at one or both of the frame rates represented in the transition (here, 24 or 48 fps). In such circumstances, the differential latency change (here, −41 mS) may not correspond to a convenient integer number of frames, in which case the number of blanked or black frames may be increased to the next integer count, and the difference between the duration of that number of frames and the minimum value can also be added as silence in the sound (audio output). In this way, whatever extra time the picture gap receives above the minimum, the sound will have a like added gap.

Similarly, transitions 623 and 613 produce differential latency changes of −9 mS and −50 mS, respectively, requiring minimum blanking gaps for those durations introduced into the picture, respectively. Conversely, transition 621 from state 620 to 610 causes ∂L to change from 2 mS to 43 mS, thus giving rise to a differential latency change of 41 mS that requires insertion of a 41 mS gap inserted into the audio track, to provide silence. Similarly, transitions 632 and 631 produce differential latency changes of 9 mS and 50 mS, respectively, requiring corresponding gaps introduced into the audio track. As before, if for some reason a transition time longer than the minimum becomes necessary, then both sound and picture signals undergo padding by a like incremental amount above the minimum.

Figure 7A:
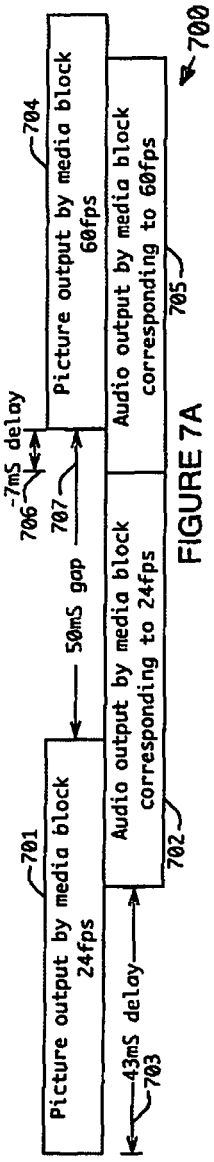
FIGS. 7A-7D depict several alternative exemplary timelines illustrating the effect on the picture and sound information of a digital cinema play list undergoing play out during a transition from 24 fps to 60 fps in accordance with the present principles.

FIG. 7A shows an exemplary timeline 700 advancing from left to right and corresponding to the transition 613 from the state 610, where digital cinema composition undergoes play out at 24 fps to the state 630 where digital cinema composition undergoes play out at 60 fps. The upper half of timeline 700 represents the picture (video) element of the digital cinema composition and the lower portion the sound (audio) element. The example timeline 700 exhibits consistency with the examples previously discussed with respect to the digital theater system 100A, table 400, and state diagram 600. Thus, at 24 fps, ∂L is 43 mS, for which reason in the timeline 700, the picture element 701 and corresponding sound element 702 remain offset from each other by ∂L 703 in the amount of 43 mS. (In accordance with the convention used herein, a positive value for ∂L indicates that sound lags the picture). Similarly, at 60 fps, ∂L is −7 mS, resulting in picture element 704 and sound element 705 being offset by ∂L 706 in the amount of −7 mS. The difference in the differential latencies 703 and 706 produce a 50 mS gap 707 in the picture information of the timeline 700. If not incompatible with the requirements of digital cinema projector 140, for the interval represented by gap 707, the digital cinema media block 130A may simply cease to output picture elements following the picture element 701 until the beginning of picture element 704. Meanwhile, with respect to the output of sound information from the digital cinema media block 130A to the theatrical sound processing system 150A, no gap or interruption exists between the sound elements 702 and 705.

Figure 7B:
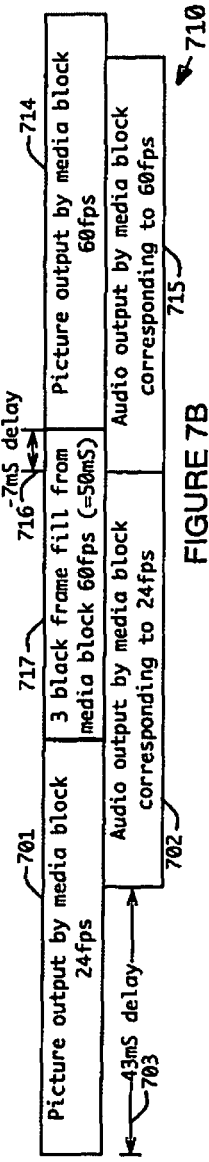

FIG. 7B shows a different exemplary timeline 710 associated with a projector 140 that does not admit a gap 707. Instead, the digital cinema media block 130A will inject an appropriate number of black frames 717 into the picture stream of the timeline 710. The aggregate duration of frames 717 should substantially equal that of the gap 707, that is, 50 mS. At 60 fps, 50 mS corresponds to three frames. After injection of the frames 717 into the picture stream, the picture element 714 plays, having a ∂L 716 (−7 mS) with respect to the audio element 715. As in the timeline 700, the digital media cinema block 130A outputs two consecutive sound elements 702 and 715 to the theatrical sound processing system 150A with no gap or interruption. This approach works well if projector 140 can instantaneously switch from 24 fps while playing picture element 701 to 60 fps in order to the play frames 717 and then the picture element 714, but will also work if projector 140 can stabilize at 60 fps before projecting the picture element 714.

Figure 7C:
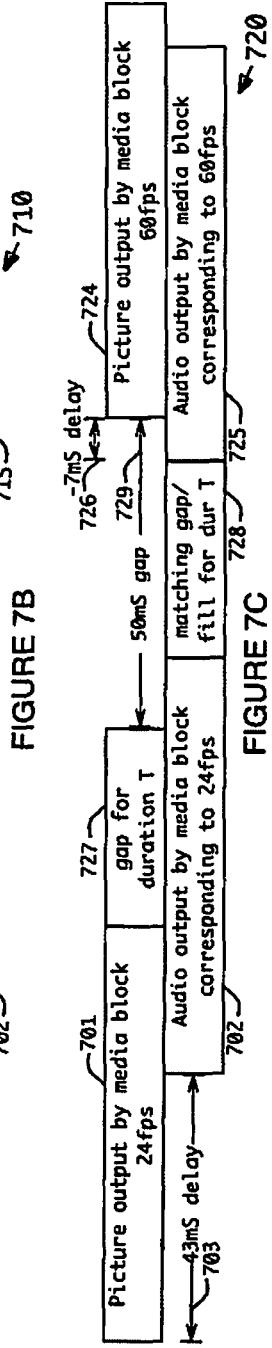

FIG. 7C shows still another exemplary timeline 720 in connection with the projector 140 when the projector cannot switch from 24 fps to 60 fps in the amount of time corresponding to the change in ∂L (i.e., the duration of the gap 707). In this case, the digital cinema media block 130 will introduce an identical extra interval 'T' introduced into each of the picture and sound tracks of timeline 720. In the picture track, a gap 727 of duration 'T' is added, either before or after ('before' is shown) gap 729 corresponding to the change in ∂L (50 mS). In the sound track, following sound element 702, a substantially like-duration gap or silent fill 728 is introduced, which leads to sound element 725 (corresponding to picture element 724 and offset from it by −7 mS as shown by ∂L 726. In various embodiments, elements 727 and 728 constitute be gaps in the corresponding signal or fill (also known as padding) representing frames of black for picture or silence for sound). The requirements of projector 140 and the theatrical sound processing system 150A will determine the length of such gaps. When using a picture filled of black frames are used, these can occur at 24 fps or 60 fps, and the duration T may correspond to the total duration of these black frames. Since timeline 720 assumes that gap 729 is acceptable, it is unlikely that black frames preceding the gap will be necessary. In some embodiments, the gap 729 and the gap 727 representing the interval T could have a reverse order, with gap 727 containing padding of black frames at 60 fps to assist projector 140 in accommodating or synchronizing to the new frame rate.

Figure 7D:
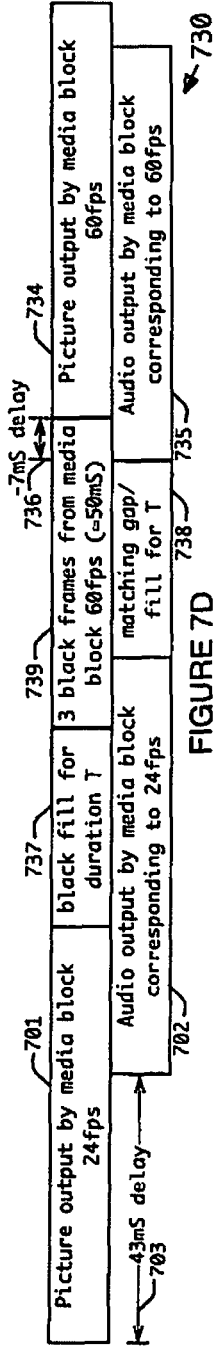

FIG. 7D shows a timeline 730, similar to the time line 720 of FIG. 7C, but with the gap 729 replaced with black frames 739, such that the picture track flows continuously from picture element 701 to fill 737 (black frames throughout duration 'T'), to the black frames 739, to picture element 734. The sound element 702 precedes the gap or silence 738, followed by the sound element 735, holding the picture-to-sound differential latency ∂L 736 with respect to the picture element 734. In this example, the fill 737 could comprise black frames at 24 fps, or at 60 fps, or both (24 fps then 60 fps) as needed to meet the requirements of the projector 140 for glitch-free operation (i.e., as needed to avoid any projection to screen 102 other than the pictures corresponding to elements 701 and 734 with an intervening interval of black for T+50 mS).

FIG. 8A shows a timeline 800 which covers the reflexive transition 631 from the state 630 at 60 fps with ∂L=−7 mS to the state 610 at 24 fps with ∂L=43 mS. In the picture track, picture element 801 at 60 fps abuts the picture element 804 at 24 fps. This assumes that projector 140 and digital cinema media block 130A can support these values. On the sound track, the sound element 802 corresponding to picture element 801 runs ahead of the picture element 801 by ∂L 803 equal to −7 mS. The sound element 805 corresponding to picture element 804 runs behind picture element 804 by ∂L 806 equal to 43 mS, which results in a 50 mS gap 807 in the sound track of the timeline 800. This assumes that the theatrical sound processing system 150A will interpret that gap as a 50 mS silence without a glitch.

FIG. 8B depicts a time line 810 analogous to the time line 710 of FIG. 7B. However, the timeline 810 depicts the digital cinema media block 130A padding the interval between sound elements 802 and 815 with 50 mS of silence 817. Here, the sound element 815 follows corresponding picture element 814 by ∂L 816 equal to 43 mS, which produced the 50 msS interval between sound elements 802/815.

FIG. 8C depicts a time line 820 analogous to the time line 720 of FIG. 7C. However, in contrast to the time line 720 of FIG. 7C, the timeline 820 of FIG. 8C assumes that the projector 140 (or the digital cinema media block 130A) cannot transition from 60 fps to 24 fps immediately, and requires some amount of time up to 'T' to successfully switch. Here, in addition to the 50 mS gap 829 that exists between the sound elements 802 and 825, there exists an additional gap 828 (for which silent fill could be substituted). A corresponding gap or black frame fill 827 occurs between the picture elements 801 and 824. The picture element 824 corresponds to sound element 825, with ∂L 826 of 43 mS.

FIG. 8D depicts a time line analogous to the time line 730 of FIG. 7D. As compared to the time line 730 of FIG. 7D, the timeline 830 of FIG. uses the silence padding 838 and 839 for both the interval 'T' and the 50 mS difference between the differential latencies 803 and 836, respectively, for use in cases where the theatrical sound processing system 150A will not cleanly accept a loss of signal between the sound elements 802 and 835. The duration 'T' could have an arbitrary duration. However, as discussed previously, if projector 140 does not readily tolerate a gap in picture signal from the digital cinema media block 130A, then the duration of 'T' may correspond to some number of frames of black at 60 fps or 24 fps, or both, to facilitate the transition to the new frame rate upon transitioning to the state 610. In any of the timelines 700, 710, 720, 730, 820, and 830, the digital cinema projector 140 may blank its output during the non-zero duration interval between picture elements as the digital cinema compositions transition from one frame rate to another, for example to hide glitches otherwise visible to the audience.

Figure 9:
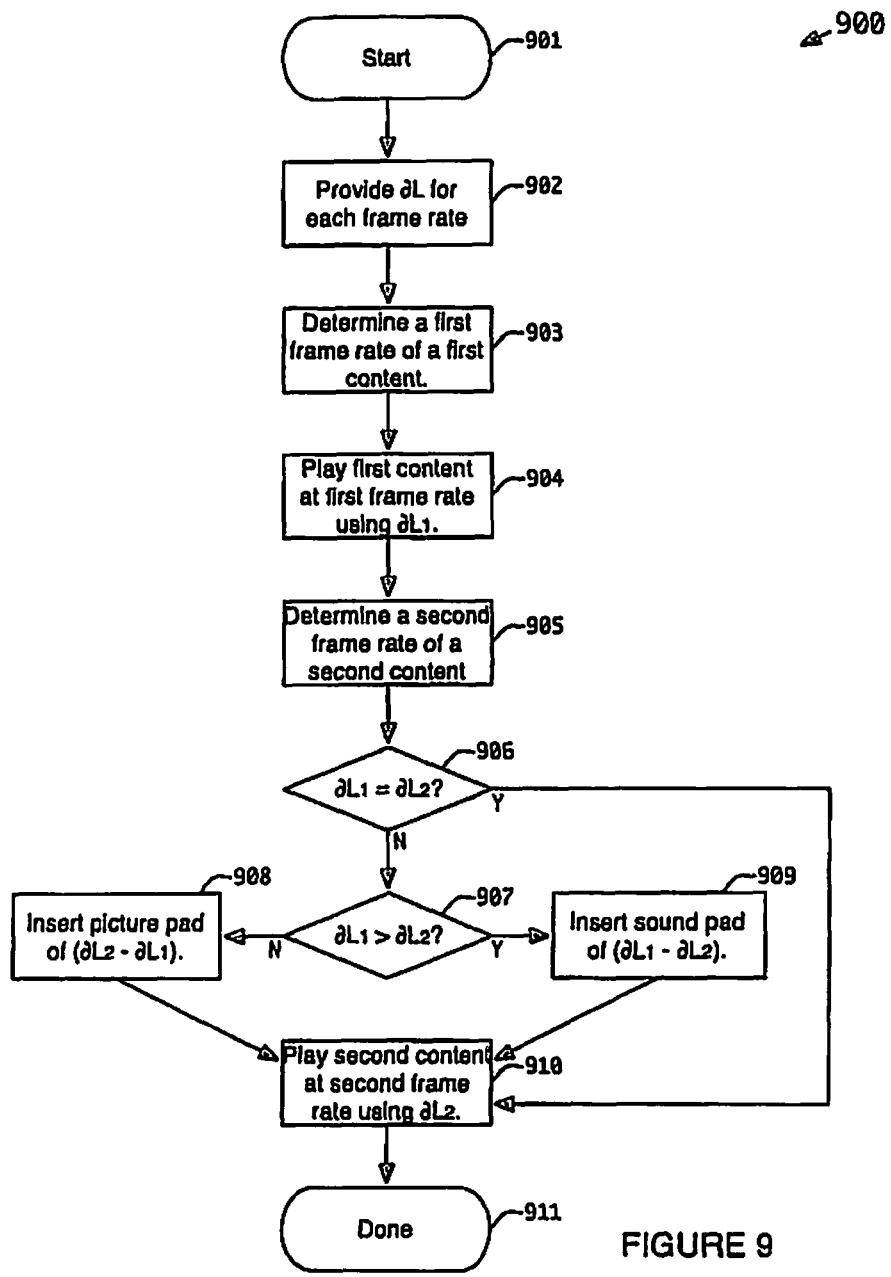
FIG. 9 depicts an exemplary flowchart for a process of modifying the differential latencies of sound and picture information upon a change in the picture frame rate in accordance with the present principles; and, FIG. 10 depicts an exemplary user interface suitable for adjusting the latencies of a digital cinema media block for different frame rates in accordance with the present principles.

FIG. 9 depicts an exemplary process 900, described with respect to the digital cinema system 100A of FIG. 1A, for managing the transition between two consecutive digital cinema compositions in case they might have different frame rates and thus induce a change in the differential latency (∂L). In general, the transition management process, exemplified by the process 900, would generally undergo execution by the digital cinema media block (e.g., 130A, 130B). However, some steps of the transition management process may require integration with projector 140 (e.g., in an embodiment, not shown, where projector 140 receives inquiries as to its latency 145 at different frame rates). Further, the process may require integration with the theatrical sound processing system 150B (e.g., as in FIG. 1B, where the audio delay 152B becomes set by signal 136).

The transition management process 900 begins at step 901, with the digital cinema media block 130A of FIG. 1A having a picture output connection to projector 140, and a sound output connection to the theatrical sound processing system 150A. During step 902, the digital cinema media block 130A accepts a differential latency for each frame rate for which the system is configured to handle (e.g., by accepting values from a technician, or by querying the projector 140 or other source). These differential latencies (∂L) can reside in the memory 135A. The differential latency may be provided empirically for each frame rate as described above, or the component latencies and delays (such as those found in columns 202, 203, 306, 406) and distance or time-of-flight to the prime seat (such as specified in column 207) may be provided and the differential latencies calculated.

During step 903, the digital cinema media block 130A determines a first frame rate for a first digital cinema composition. For example, the digital cinema media block 130A could determine the frame rate by examining metadata in the digital cinema composition, or in any of the corresponding picture asset files. During step 904, the digital cinema media block 130A recalls the differential latency $\partial L_1$ corresponding to the first frame rate from the memory 135A and applies that value when setting the differential delay 134A. If an additional delay becomes necessary to allow the digital cinema media block 130A or projector 140 to adjust to the newly set frame rate, that delay setting occurs during this step as well. Otherwise, or after which, the first digital cinema composition undergoes play out by the digital cinema media block 130A with differential delay 134A set to $\partial L_1$. This results in a presentation to the audience with a proper net picture-to-sound latency, which is to have a value of zero or nearly zero at the prime seat 102.

During step 905, the digital cinema media block 130A determines the second (next) frame rate corresponding to a second (next) digital cinema composition. During this step, the digital cinema media block 130A recalls the corresponding differential latency $\partial L_2$ from memory 135A. Next, step 906 undergoes execution during which the digital cinema media block 130A makes comparison determine whether $\partial L_1$ is equal to $\partial L_2$ (or that the current and next frame rates equal each other). If so, then the process branches to step 910 during which time, the second (next) digital cinema plays with the same differential latency. Generally, this means that no gap or filler becomes needed between play out of the first and second digital cinema compositions. However, if a change occurs in the picture format (e.g., between scope and flat, or between 2D and 3D) for which the digital cinema projector 140 may require or impose a delay, then even though there is no change in differential latency required, the digital cinema media block 130A can insert a gap and/or filler of appropriate type and duration into each of the sound and picture tracks before proceeding to play out the second digital cinema composition.

If during step 906, the digital cinema media block 130A determines that $\partial L_1$ and $\partial L_2$ are unequal, then during step 907, the digital cinema media block makes a determination to whether the new differential latency ($\partial L_2$) has a smaller value than the current latency ($\partial L_1$). If so, then during step 909, as the sound element of the first digital cinema composition finishes playing, the digital cinema media block inserts a sound pad (either silence or a gap, as required) of duration $\partial L_1 - \partial L_2$ immediately afterward into the sound track (e.g., as with gap 807 or silent element 817), and processing continues at step 910. If ∂L$_2$>∂L$_1$, then from step 907, the process 900 of FIG. 9 branches to step 908 whereupon after the picture element of the first digital cinema composition finishes playing, the digital cinema media block 130A inserts a picture pad (either black frames or a gap, as required) of duration ∂L$_2$–∂L$_1$ immediately afterward into the picture track (e.g., as with gap 707 or black frames 717), and here too, processing continues at step 910.

During step 910, the digital cinema media block 130A begins to play the second digital cinema composition to follow the first, but with the differential delay 134A set to ∂L$_2$. Unless additional delays become necessary, as in timelines 720, 730, 820, and 830, the second digital cinema composition undergoes play out immediately after the first digital cinema composition, with the sound element of the second digital cinema composition immediately following the sound element of the first digital cinema composition, or the sound pad, if inserted during step 909. Likewise, the picture element of the second digital cinema composition immediately follows the picture element of the first digital cinema composition or the picture pad, if inserted during step 908. If additional delays become necessary, as previously discussed, then the digital cinema media block 130A inserts these into both the picture and sound tracks during step 910 with matching gaps 727 and 728, 737 and 738, 827 and 828, and 837 and 838. These matching gaps may occur before any inserted pads (at step 908 or 909) as shown in the timelines 720, 730, 820, 830; or they may be inserted after those pads (not shown).

In another exemplary embodiment of the transition management process suitable for use with digital theater system 100B, in step 902, instead of calculating a differential latency (which is not used in digital theater system 100B), the appropriate audio delay settings ($t_{AUDIO\_DELAY}$) are provided instead, whether empirically, or by calculation. There may be cases where (as in the row for 60 fps in table 500) the maximum or minimum allowable settings for the audio delay 152B (as with the zero in column 506) may be insufficient to achieve perfect picture-to-sound sync at the prime seat 120. In such cases, when the audio delay settings ($t_{AUDIO\_DELAY}$) are being calculated, the calculated value gets clamped to the allowable range. Thus, in the case of the 60 fps row in table 500, if calculated, the ideal audio delay value for the theatrical sound processing system would be –7 mS, but since that value exceeds the lower limit, the value gets clamped to the minimum allowable value (i.e., zero). In other steps corresponding to process 900, ∂L, would get replaced by the corresponding $t_{AUDIO\_DELAYn}$.

Figure 10:
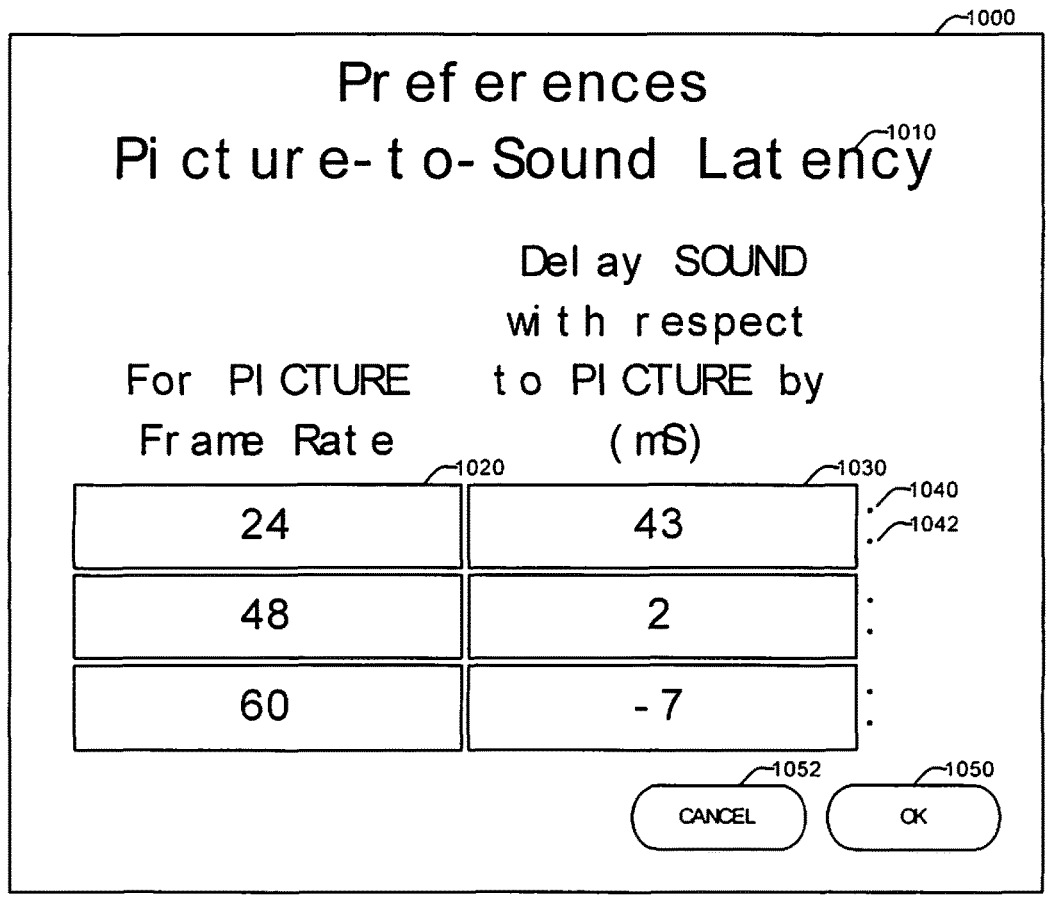

FIG. 10 depicts one example user interface 1000 for practicing the picture and sound synchronization technique of the present principles, as might be used in step 902 for an embodiment that relies on manual configuration. The interface 1000 of FIG. 10 provides a suitable dialog 1010 to allow an operator to set a different differential delay for each frame rate in column 1020. In the example shown, the operator can enter specific differential delay information such shown in column 405 into the cells of column 1030 or can adjust such values using increment/decrement arrow buttons 1040 and 1042, respectively. After adjusting the settings in column 1030, the operator will press the OK button 1050 to store those settings to memory 135A, whereas pressing CANCEL button 1052 will abort any change to those settings.

In an alternate embodiment (not shown), rather having an operator enter the differential latencies such as in column 405, the media block 130A could compute from individual component values for projector latency (e.g., columns 202, 203), theatrical sound processing system audio delay (columns 306 or 406), and the prime seat distance 105 (e.g., as in column 207), the corresponding differential latency for delay 135A for any frame rate in question. This would be a good design choice for many different frame rates of interest and if the projector specifications clearly supply the latency information. In such a circumstance, when the operator presses the OK button, the digital media cinema block 130A will compute the corresponding differential latencies and store the values in the memory 135A. Alternatively, the digital cinema media block 130A will store parameters as given and compute the differential latencies whenever needed. The memory 135A serves to store data indicative of the differential latency for each necessary frame rate.

The foregoing describes a method and apparatus for synchronizing picture (video) and sound (audio) for digital cinema compositions at different frame rates.

The invention claimed is:

1. A method for synchronizing sound information with corresponding picture information for contents having different frame rates in a play list during play out of the contents, the method comprising:
 establishing for the corresponding picture information of the contents in the play list, associated audio latency settings in accordance with the content frame rates; and
 adjusting timing between the sound information and the picture information during play out in of the contents in accordance the associated audio latency settings for the corresponding content frame rates.

2. The method according to claim 1 wherein the timing between the sound information and the picture information is adjusted to achieve a nearly zero differential latency between corresponding sound and picture elements at a given content frame rate.

3. The method according to claim 1 wherein the audio latency settings are established for content frame rates of 24 frames per second, 48 frames per second, and 60 frames per second.

4. The method according to claim 1 wherein the audio latency settings are established through empirical measurement of receipt the picture and sound information.

5. The method according to claim 1 wherein the audio latency settings are calculated in accordance with digital system specifications.

6. The method according to claim 1 wherein the timing between the sound information and picture information is adjusted to delay presentation of picture elements in the picture information if the picture elements lead sound elements.

7. The method according to claim 1 wherein the timing between the sound information and picture information is adjusted to delay presentation of sound elements in the sound information picture if the sound elements lead the picture elements.

8. The method according to claim 1 further comprising inserting one of a gap or filler between sound elements and between picture elements of a first content playing out at a first frame rate prior playing out a second content at a second frame rate.

9. The method according to claim 8 wherein the gap for the sound elements comprises silence.

10. The method according to claim 8 wherein the filler between picture elements comprises one of blanked or black frames.

11. In a system for presentation of contents in a play list, an apparatus for substantially synchronizing picture information and sound information for each content irrespective of a content frame rate, the apparatus comprising:

media block for rendering contents received at their frames rates, the digital media block (a) establishing for the corresponding picture information of the contents in the play list, associated audio latency settings in accordance with the content frame rates; and (b) adjusting timing between the sound information and the picture information during play out in of the contents in accordance the associated audio latency settings for the corresponding content frame rates.

12. The apparatus according to claim 11 wherein the digital media block adjusts the timing between the sound information and the picture information to achieve a nearly zero differential latency between corresponding and picture elements in at a given content frame rate.

13. The apparatus according to claim 11 wherein the digital media block establishes the audio latency settings for content frame rates of 24 frames per second, 48 frames per second, and 60 frames per second.

14. The apparatus according to claim 11 wherein digital media block calculates the audio latency settings accordance with specifications of the digital system.

15. The apparatus according to claim 11 wherein digital media block adjusts the timing between the sound information and picture information to delay presentation of picture elements in the picture information if the picture elements lead sound elements.

16. The apparatus according to claim 11 wherein digital media block adjusts the timing between the sound information and picture information to delay presentation of sound elements in the sound information picture if the sound elements lead the picture elements.

17. The apparatus according to claim 11 wherein digital media block inserts one of a gap or filler between sound elements and between picture elements of a first content playing out at a first frame rate prior play out of a second content at a second frame rate.

18. The apparatus according to claim 17 wherein the gap for the sound elements comprises silence.

19. The apparatus according to claim 17 wherein the filler between picture elements comprises one of blanked or black frames.

* * * * *